J. C. CONRAD.
COTTON MACHINE.
APPLICATION FILED JAN. 27, 1919.
1,331,001.
Patented Feb. 17, 1920.
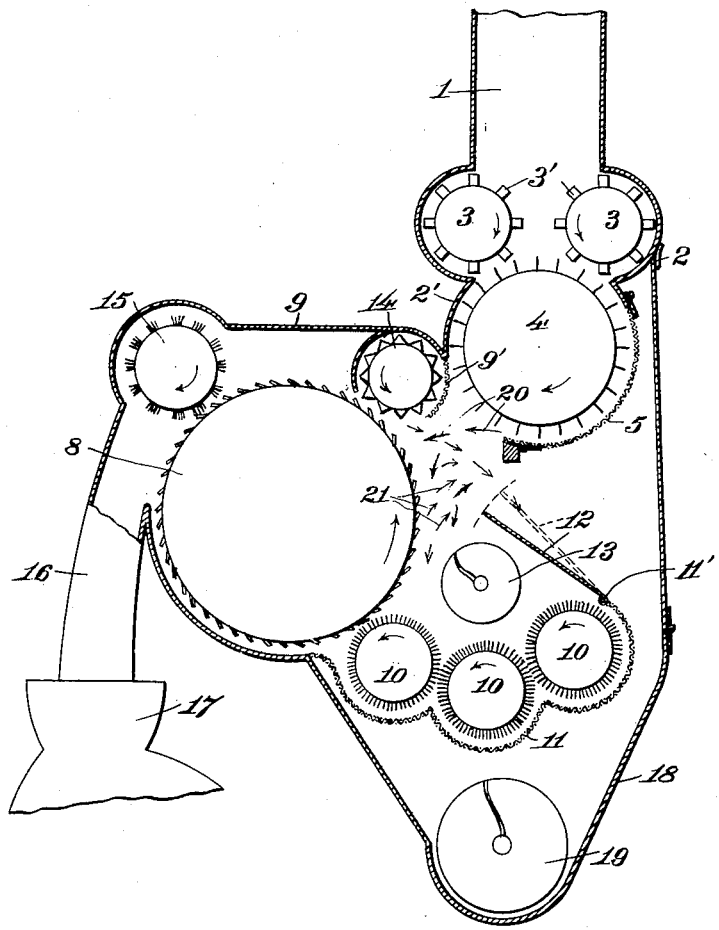
Inventor:
Joshua C. Conrad,
by Joshua R. H. Potts
Atty.

UNITED STATES PATENT OFFICE.

JOSHUA C. CONRAD, OF CEMENT, OKLAHOMA.

COTTON-MACHINE.

1,331,001.  Specification of Letters Patent.  Patented Feb. 17, 1920.

Application filed January 27, 1919. Serial No. 273,371.

*To all whom it may concern:*

Be it known that I, JOSHUA C. CONRAD, a citizen of the United States, residing at Cement, county of Caddo, and State of Oklahoma, have invented certain new and useful Improvements in Cotton-Machines, of which the following is a specification.

My invention relates to cotton machines, and particularly to machines for cleaning the cotton and removing the hulls to prepare the cotton for the gin.

The object of my invention is to provide a device of the class mentioned adapted for removing the hulls and dirt from bolly cotton to properly prepare the cotton for the gins. A further object of my invention is to provide a cleaning device as mentioned which shall be adapted for use as an independent machine or as a feeding device to be located between the distributer and the gins. A further object of my invention is to provide a device of the character mentioned which will not readily become clogged by the hulls. Other objects will appear hereinafter.

With these objects in view, my invention consists generally in a feeding device, in combination with a separator comprising a saw cylinder in the path of the cotton ejected from the feeder, a beater, and means for receiving the hulls and dirt and conveying the same from the machine. My invention further consists in a device as mentioned further characterized by means for catching the cotton ejected from the feeder and not immediately caught by the saw cylinder, which shall maintain said cotton in contact with said cylinder. My invention further consists in a device as mentioned in which the beater is equipped with a guard to prevent the hulls from clogging the same. A further object of my invention is to provide a cleaning device as mentioned in which the means for receiving the hulls and dirt is adjustable so as to regulate the device to suit conditions. My invention further consists in various details of construction, and arrangements of parts, all as will be fully described hereinafter and particularly pointed out in the claims.

My invention will be more readily understood by reference to the accompanying drawing forming a part of this specification, and in which the figure is a vertical, diagrammatic section of a cotton machine embodying my invention.

In gin houses, the gins and feeders are usually arranged in pairs and supplied from a common distributer having branches leading to the feeder of the respective gins. As this is a common and ordinary arrangement, I have illustrated but one machine and one branch of a distributer in conjunction therewith. It will also be obvious as the description proceeds that the device may be used as a separate machine for cleaning the cotton which is to be subsequently fed to gins.

Referring to the drawings, 1 indicates the branch of the distributer leading to the feeder proper 2. This preferably comprises a pair of rolls 3, 3, arranged side by side, and provided with radial elements 3', and a larger spiked roll 4 arranged beneath the same. The rolls are arranged within a suitable casing 2', and within said casing and in close proximity to the roll 4, is a screen 5. The cotton passes from the distributer 1 between the rolls 3 to the roll 4 which carries the same across the screen 5, and a quantity of the dust and dirt in the cotton is sifted through the screen 5 and disposed of in a manner hereinafter described.

The cotton and hulls are ejected substantially tangentially from between the roll 4 and the end of the screen 5 to the mechanism for removing the hulls and further cleaning the cotton before passing the same to the gin. This mechanism for removing the hulls and the remainder of the dirt comprises a toothed or saw cylinder 8, arranged so that the upper portion is in the path of the cotton and hulls ejected from the feeder; means for feeding the cotton against the same; and a beater for knocking the hulls from the cotton on the cylinder 8. This mechanism is arranged within a suitable casing 9, which may be formed as a continuation of the feeder casing 2'. Arranged in the casing 9, adjacent the bottom of the cylinder 8, is a plurality of spiked rolls 10 which are rotated in the direction of the arrows. A screen 11 extends beneath said rolls 10 from a point on the casing 9 below the roll 8, conforming to the periphery of said rolls and terminating adjacent the top of the outermost of said rolls, at which point 11' is hingedly connected an inclined imperforate member 12, the free end of which lies substantially beneath the inner or discharge end of the screen 5. Arranged above the rolls 10 is a screw conveyer 13. Adjacent the upper side of the cylinder 8 is a beater 14, which is rotated in the direction of the arrow. This is provided with a casing 9' which completely incloses the same except on the side adjacent the cylinder 8. Upon the opposite side of the cylinder from the beater 14 is a brush 15 which removes the cotton from the cylinder and feeds the same through the passageway 16 to the gin 17. The casing 9, beneath the rolls 10, is trough-shaped, as indicated at 18, and in the bottom thereof is arranged a screw conveyer 19.

In operation, bolly cotton is fed between the rolls 3, either from the distributer 1 or otherwise, to the roll 4, and is carried thereby over the screen 5. This much of the operation causes a considerable portion of the dust and dirt to be sifted through the screen 5 where it falls upon the member 12, passing downwardly thereon into the hopper-shaped bottom 18 of the casing to be removed by the screw conveyer 19. The cotton and hulls are ejected substantially tangentially from between the roll 4 and screen 5 against the upper portion of the saw cylinder 8. The cotton ejected against the saw cylinder is not a solid stream, but is in a scattered condition. The portion of the cotton that is ejected against the saw cylinder adheres thereto and is carried upwardly where it is engaged by the beater 14. The beater 14 knocks the hulls from the cotton on the saw cylinder, driving them in the direction of the arrows 20 through the space between the end of the member 12 and the screen 5 where they pass into the hopper 18. The portion of the cotton and hulls which does not immediately adhere to the saw cylinder falls downwardly onto the rolls 10 and these rolls, together with the distributing conveyer 13, maintain such cotton and hulls in position against the saw cylinder until it adheres thereto. The cotton carried upwardly from the rolls 10 by the saw cylinder carries portions of the hulls therewith, which hulls are knocked therefrom by the beater 14. A considerable quantity of hulls is thrown upwardly by the saw cylinder in the direction of the arrows 21 and falls upon the member 12, passing from thence to the hopper 18. The cotton on the saw cylinder after being separated from the hulls is removed from the cylinder by the brush 15 and ejected into the passageway 16 leading to the gin 17. It should be noted that the member 12 may be adjusted to vary the space between the free end of the same and the end of the screen 5 so as to receive the hulls thrown by both the saw and the beater with the greatest efficiency.

Any ordinary or preferred means may be used to drive the various rolls, cylinder, beater, and conveyers, and I have not illustrated any means for this purpose, as it forms no part of the invention. The only thing essential with relation to the invention is that the several parts be driven in the direction indicated by the arrows.

I claim:—

1. In a device of the class described, a distributer and feeder, in combination with a gin, and means interposed between said feeder and said gin for cleaning and removing hulls from the cotton, said means comprising a casing, a toothed cylinder, means for moving the cotton discharged from said feeder into contact with said toothed cylinder, a hull beater, an inclined member arranged to receive the hulls thrown off by said beater and the toothed cylinder, and means for removing the seed cotton from said cylinder and discharging the same to said gin, substantially as described.

2. A cotton machine as set forth in claim 1 in which the inclined member is pivotally and adjustably mounted.

3. In a device of the class described, a feeder including a spiked roll, and a foraminated member partially inclosing said roll and extending beneath the same, in combination with a toothed cylinder arranged to receive the cotton discharged between said roll and said screen, a plurality of spiked rolls arranged adjacent the lower portion of said toothed cylinder and adapted to maintain the cotton thereon in contact with said cylinder, a conveyer above said last-mentioned rolls, an inclined member arranged above said conveyer and beneath said screen, and a beater, said inclined member being adapted to receive the hulls thrown off by said beater and by said cylinder, substantially as described.

4. A device as set forth in claim 3 in which said inclined member is hingedly mounted.

5. A device as set forth in claim 3 further characterized by a screen arranged beneath the last-mentioned rolls, and a conveyer beneath said screen.

6. In a device of the class described, a distributer and feeder, in combination with a gin, and means interposed between said feeder and gin for cleaning and removing hulls from the cotton, said means comprising a casing, a toothed cylinder, means for moving the cotton discharged from said feeder into contact with said toothed cylinder, a hull beater, a casing for said beater, and means for removing the said cotton from said cylinder and discharging the same to said gin, substantially as described.

In testimony whereof I have signed my name to this specification in the presence of two subscribing witnesses.

JOSHUA C. CONRAD.

Witnesses:
J. W. ROLAND,
J. M. PITTMAN.